US012592927B2

(12) United States Patent
　　 Refua

(10) Patent No.:　US 12,592,927 B2
(45) Date of Patent:　　Mar. 31, 2026

(54) DYNAMIC VIRTUAL IDENTIFIER GENERATION FOR USER INTERACTION AUTHORIZATION VERIFICATION AND LOGGING

(71) Applicant: Navan, Inc., Palo Alto, CA (US)

(72) Inventor: Yuval Refua, Sunnyvale, CA (US)

(73) Assignee: Navan, Inc., Palo Alto, CA (US)

( * ) Notice: Subject to any disclaimer, the term of this patent is extended or adjusted under 35 U.S.C. 154(b) by 30 days.

(21) Appl. No.: 18/416,720

(22) Filed: Jan. 18, 2024

(65) Prior Publication Data

US 2024/0244056 A1　　Jul. 18, 2024

Related U.S. Application Data

(60) Provisional application No. 63/480,505, filed on Jan. 18, 2023.

(51) Int. Cl.
　　 *H04L 9/40*　　　　　(2022.01)
　　 *G06F 21/31*　　　　 (2013.01)
(52) U.S. Cl.
　　 CPC ............ *H04L 63/102* (2013.01); *G06F 21/31* (2013.01)
(58) Field of Classification Search
　　 CPC ............................... H04L 63/102; G06F 21/31
　　 USPC ...................................... 726/4; 709/223, 224
　　 See application file for complete search history.

(56) References Cited

U.S. PATENT DOCUMENTS

| 10,445,739 | B1 | 10/2019 | Sahni et al. |
| 12,400,196 | B1 | 8/2025 | Roth et al. |
| 12,423,692 | B2 | 9/2025 | Stark et al. |
| 2021/0004912 | A1 | 1/2021 | Stark et al. |
| 2021/0295452 | A1* | 9/2021 | Dutt ........................ G06Q 20/36 |
| 2021/0326877 | A1* | 10/2021 | Goodwin ........... G06Q 20/3672 |
| 2022/0261759 | A1* | 8/2022 | Fredericks ............. G06Q 40/00 |

(Continued)

FOREIGN PATENT DOCUMENTS

| CN | 102006583 | B | * | 6/2015 | |
| CN | 105681299 | A | * | 6/2016 | ......... H04L 65/1069 |

(Continued)

OTHER PUBLICATIONS

PCT International Search Report and Written Opinion, PCT Application No. PCT/US24/12033, Apr. 17, 2024, 13 pages.

(Continued)

*Primary Examiner* — Liang Che A Wang
(74) *Attorney, Agent, or Firm* — Fenwick & West LLP

(57) ABSTRACT

A networked system generates virtual identifiers for network entities to identify interactions of these entities with other entities in the network. These virtual identifiers are generated upon detecting trigger events. Upon the detection of an event that triggers the generation of a virtual identifier, the networked system seeks a virtual identifier from an account management system. This virtual identifier serves as a unique identifier associated with the user but that represents an account that the user is authorized to use. The system associates the virtual identifier with aspects of the triggering event, such as the user linked with the trigger event or the event itself. Consequently, when the system detects an interaction bearing the virtual identifier, the system can associate the interaction with the user who initiated the interaction.

20 Claims, 4 Drawing Sheets

(56)     References Cited

U.S. PATENT DOCUMENTS

2023/0169512  A1     6/2023  Rendheer
2024/0185333  A1     6/2024  Ampomah et al.

FOREIGN PATENT DOCUMENTS

CN          119728638  A  *  3/2025
WO     WO-2022079500  A1     4/2020

OTHER PUBLICATIONS

United States Office Action, U.S. Appl. No. 18/416,635, filed Oct. 27, 2025, 8 pages.

* cited by examiner

Detect Trigger Event
200

Request Virtual Identifier
210

Receive Virtual Identifier
220

Associate Central Account with Virtual
Identifier
230

Receive Interaction Information with Virtual
Identifier
240

Associate Interaction with User based on
Virtual Identifier
250

DYNAMIC VIRTUAL IDENTIFIER GENERATION FOR USER INTERACTION AUTHORIZATION VERIFICATION AND LOGGING

CROSS-REFERENCE TO RELATED APPLICATIONS

This application claims the benefit of U.S. Provisional Application No. 63/480,505, filed Jan. 18, 2023, which is incorporated by reference.

BACKGROUND

Network systems are complex digital ecosystems that encompass a myriad of computing devices, such as servers, workstations, Internet of Things (IoT) gadgets, and mobile devices, all of which interact with one another over a network infrastructure. Both wired and wireless networks are employed to facilitate the seamless communication between these varied components. As a consequence of this interconnectivity, each device continuously generates its own data, culminating in a massive volume of data that warrants meticulous analysis.

Network systems also enable users to interact with one another or with specific systems residing within the network. This interaction could involve information sharing, resource allocation, or communication workflows, among other possibilities. Owing to the diverse and sensitive nature of these activities, certain users may be granted authorization to execute specific actions within the network.

Some network entities give users authorization to perform certain interactions with other entities in the network system on behalf of the network entity. To authorize these users, network entities may associate users with a central account that is managed by an account management system. Such an authorized user can execute interactions within the network system by providing their own identification information and an account identifier associated with the central account. The account management system verifies that the user is authorized and thereby authorizes the user's interactions.

However, where many users are using the account identifier associated with the central account for different interactions, network entities associated with the central account are unable to provide different authorizations to different users. Furthermore, interaction logs describing interactions in the network system are commonly associate interactions with the account identifier used to authorize the interaction. Therefore, interaction logs are commonly ineffective at describing interactions within the network system.

SUMMARY

In accordance with some embodiments, an interaction authorization system generates virtual identifiers for network users to identify interactions of these users with other entities in the network. These virtual identifiers are generated upon detecting trigger events. A trigger event may involve a user requesting access to a specific system resource or initiating an application workflow within the network. Upon detecting a trigger event, the interaction authorization system requests a virtual identifier from an account management system. This virtual identifier serves as a unique identifier associated with the user but that represents an account that the user is authorized to use. For example, without the virtual identifier, the user may normally provide an identifier for an account with which the user is associated. This account identifier authorizes the user to perform certain interactions with other entities within the networked system. When the user has been assigned a virtual identifier, the user uses the virtual identifier rather than the account identifier to authorize their interactions.

An interaction authorization system associates the virtual identifier with aspects of the triggering event, such as the user linked with the trigger event or the event itself. Consequently, when the interaction authorization system detects an interaction bearing the virtual identifier, the interaction authorization system can associate the interaction with the user who initiated the interaction. The interaction authorization system can thereby apply authorization rules to the interaction based on the linked user and interaction. The interaction authorization system also may generate interaction logs that associate a user's interaction with their assigned virtual identifier.

By dynamically employing virtual identifiers, the interaction authorization system can associate users with the authorization privileges of a central account while also performing per-user authorization for interactions that users perform. Furthermore, the interaction authorization system improves interaction logging by generating interaction logs that associate interactions with particular users, rather than solely to the central account used by the users. Thus, the interaction authorization system and its operators can more effectively track user interactions and detect unauthorized interactions.

BRIEF DESCRIPTION OF THE DRAWINGS

Figure (FIG.) 1 illustrates an example system environment for an interaction authorization system, in accordance with some embodiments.

DETAILED DESCRIPTION

System Environment

Figure 1:
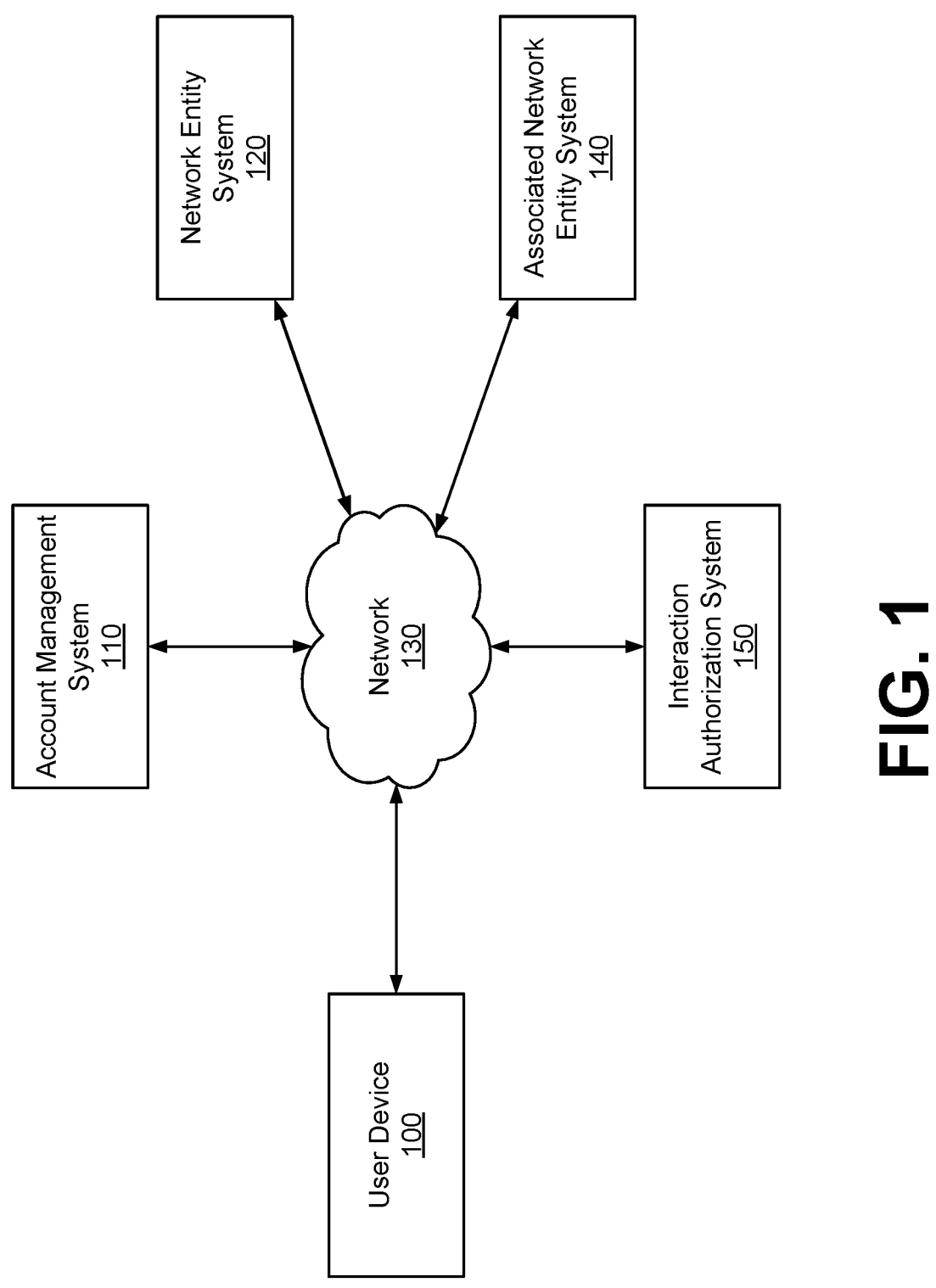

Figure (FIG.) 1 illustrates an example system environment for an interaction authorization system 150, in accordance with some embodiments. The system environment illustrated in FIG. 1 includes a user device 100, an account management system 110, a network entity system 120, a network 130, an associated entity system 140, and an interaction authorization system 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user can interact with other systems in a network through a user device 100. The user device 100 can be a personal or mobile computing device, such as a smartphone, a tablet, a laptop computer, or desktop computer. In some embodiments, the user device 100 executes a client application that uses an application programming interface (API) to communicate with other systems through the network 130.

The user corresponding to the user device 100 may be associated with a central account at an account management system 110 by a network entity associated with the associated entity system 140. A central account with the account management system 110 authorizes users associated with the central account to perform certain interactions in the network on behalf of the associated network entity. Users associated the central account may be employees of the associated network entity (e.g., a corporation, company, or organization). However, the associated network entity may have one or more restrictions that restrict or define specific parameters around the interactions that the user performs on behalf of the associated network entity. For example, the associated network entity may restrict which other network entities a user can interact with, when the user can interact with those entities, or what types of interactions users can have with those entities.

The user device 100 receives authorization results for the user's interactions that were processed by the interaction authorization system 150. These authorization results indicate whether the user's interaction complies with the associated network entity's restrictions for their central account. These results can be received in real-time or near real-time. For example, the user device 100 can be notified on a mobile application or via another notification mechanism. The user may be notified that the interaction has been authorized or denied and the notification may specify certain details around the restrictions that will be violated by the interaction (e.g., the user is not authorized to perform that kind of interaction). In some cases, the interaction proceeds even if it violates a restriction set by the network entity. In other cases, the interaction is blocked or prevented based on the violation of the entity's restrictions. In this example, the user may receive a notification as to why the interaction is not going through, and may modify the interaction to comply with the associated entity's restrictions.

The network entity system 120 is a computing system that is operated by a network entity. The user interacts with the network entity by interacting with the network entity system 120 through the user device 100. For example, the user device 100 may request that the network entity system 120 exchange information or resources with the user device 100 or may request that the user device 100 access information stored by the network entity system 120. The user device 100 also may provide information to or receive information from a third-party system as part of an interaction with a network entity system 120.

The user device 100 may interact with a network entity system 120 on behalf of an associated network entity. As used herein, an associated network entity is a network entity on whose behalf the user may perform an interaction. In these cases, the user device 100 may provide, with interaction information for an interaction, an account identifier for a central account associated with the associated network entity. The account identifier is an alphanumeric string that the account management system 110 associates with the associated network entity.

The associated network entity operates an associated network entity system 140. This associated network entity may be a business, organization, or government, and the user may be an agent or employee of the entity. Alternatively, the entity may be a human with whom the user interacts over the network. The associated network entity system 140 may receive restriction results from the interaction authorization system 150 that indicate whether a user's interaction is authorized by the restrictions on the central account set by the entity. These restriction results can be presented in an interface to, for example, other users associated with the entity that manage adherence to those restrictions. While the associated network entity system 140 is primarily described herein as being separate from the interaction authorization system 150, the entity system 140 may perform some or all of the functionality of the interaction authorization system 150. In some embodiments, the interaction authorization system 150 is provided by another party, and the entity subscribes to the interaction authorization system 150 through that other party so that the entity can use the system 150 to dynamically manage its interactions. In other embodiments, another party may provide software that the entity can purchase or use to provide the interaction authorization system 150 functionality within the entity system 140.

The account management system 110 is a computing system manages central accounts for network entities and facilitates interactions between users and entities using these central accounts. The account management system 110 includes hardware systems that receive and transmit interaction information, and includes software systems that process interactions and ensure the validity of the interactions. Interaction information is information that describes an interaction between a user and a network entity. For example, interaction information may include a time, central account number, an identifier for the network entity with which the user interacted, or other information associated with the interaction.

The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. Similarly, the network 130 may use phone lines for communications. The network 130 may transmit encrypted or unencrypted data.

The interaction authorization system 150 is a computing system that manages interactions performed for a network entity by users. The interaction authorization system 150 receives restrictions from an associated network entity system 140, which constrain or define limits or parameters around the interactions that a user may perform for the entity using the central account of the entity. For example, the restrictions may restrict when the user can perform interactions using the central account, what kinds of interactions the user can perform, or which network entities the user can perform interactions with. The interaction authorization system 150 receives interaction information from the account management system 110 and determines whether the interaction described by the interaction information complies with the restrictions from the entity system 140. The interaction authorization system 150 may transmit restriction results to the user through the user device 100 and to the entity through the associated network entity system 140. These results indicate whether an interaction complies with the restrictions of the entity. If the interaction does not comply with the restriction, the interaction authorization system 150 may approve or reject the interaction, ask for additional information about the interaction, transmit a request to the user device 100 for the user to reverse the interaction, allow the user to contest the approval or rejection, among other possibilities.

The interaction authorization system 150 also may generate virtual identifiers for detected trigger events to improve interaction logging and to improve review of interactions for compliance with interaction restrictions. For example, the interaction authorization system 150 may detect when a user performs an action that may lead to the user performing an interaction using the central account for the network entity. When the interaction authorization system 150 detects these trigger events, the interaction authorization system 150 may request a new virtual identifier from the account management system 110 to track interactions that a user performs using the central account of the network entity. An interaction authorization system's use of virtual identifiers is described in further detail below.

Example Method for Dynamic Virtual Identifier Generation

Figure 2:
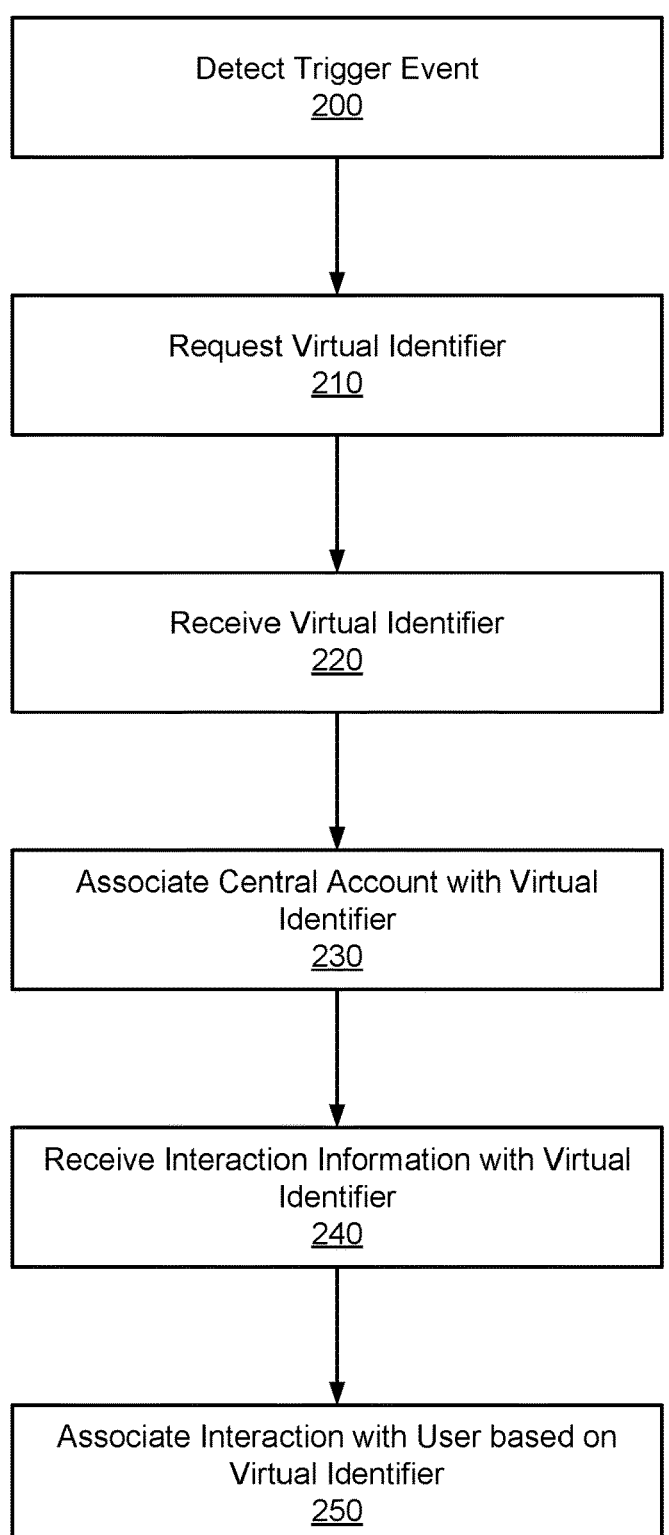
FIG. 2 is a flowchart for a method of dynamic virtual identifier generation, in accordance with some embodiments.

FIG. 2 is a flowchart for a method of dynamic virtual identifier generation, in accordance with some embodiments. Alternative embodiments may include more, fewer, or different steps from those illustrated in FIG. 2, and the steps may be performed by an interaction authorization system (e.g., interaction authorization system 150) or a different system. Additionally, each step may be performed automatically by an interaction authorization system without human intervention.

The interaction authorization system detects 200 a trigger event. A trigger event represents an action taken by a user that may lead to the user performing an interaction using the central account for the network entity. For example, trigger events may be generated when a user initiates an application workflow to interact with a network entity or when the user device transmits a request to the interaction authorization system 150 to perform an interaction. Trigger events may include a time period during which a user is expected to perform interactions on behalf of the network entity. For example, if the trigger event is the user device initiating a workflow to exchange information held by another network entity system using the central account of the network entity system, the trigger event may include a time period during which the user device may exchange the information with the other network entity system.

The interaction authorization system may receive trigger events from user devices or network entity systems. For example, when a user uses a user device to take an action that would cause a trigger event, the user device may generate a trigger event and transmit it to the interaction authorization system. In this instance, the detection 200 of the trigger event occurs when the user device (or entity device) notifies the interaction authorization system of a trigger event. The interaction authorization system may itself detect and may generate trigger events. For example, the interaction authorization system may receive logged data from user devices or network entity systems and determine that the users are likely to use the central account of the network entity system during a time period. The detection 200 of the trigger event may occur automatically by the interaction authorization system, such that it detects that there is a trigger event without further user interaction or explicit notification to the interaction authorization system that such an event will be occurring.

In response to detecting the trigger event, the interaction authorization system requests 210 a virtual identifier from an account management system for the user's interaction associate with the trigger event. A virtual identifier is an identifier, such as a unique identifier (e.g., a randomly-generated string), that can be used as a replacement identifier for a central account without using the account identifier itself. But the virtual identifier may be used by the interaction authorization system as a unique identifier not just for the user's interaction, but also for a particular user using the central account for an interaction, or may also be a unique identifier of the interaction itself or to a collection of interactions related to an event.

In some embodiments, the interaction authorization system requests a single virtual identifier for multiple trigger events. For example, if the user generates multiple trigger events that indicate that the user is likely to perform multiple interactions within a time period using the central account, the interaction authorization system may request a single virtual identifier for all of the trigger events. Alternatively, the interaction authorization system may request a separate virtual identifier for each trigger event.

Where the interaction authorization system uses the virtual identifier as an identifier for a user, it allows an entity to identify that particular user's interactions amongst other users' interactions on the same central account. The same virtual identifier may always be used for the same user. However, the virtual identifier may also be linked to a trigger event or interaction event (e.g., a particular exchange of information with another network entity). In this case, the interaction authorization system uses the virtual identifier as an identifier for all interactions related to that trigger event. In another example, the virtual identifier might identify both the user and the trigger event, so it is clear that an interaction is a particular user's interaction. In this example, the particular user's interaction is easily identified for review or logging separate from interactions by other users that may be related to the same event. In a further example, the virtual identifier may be used as an identifier for specific interactions or groups of interactions related to a trigger event. For example, if a user is using the central account for a set of interactions with a network entity, the interaction authorization system may issue a virtual identifier for each interaction or may issue a first virtual identifier for interactions of a first type in the set of interactions, a second virtual identifier for interactions of a second type, and so on. It may also allow an entity to disambiguate different interactions from one another by the same user. As a further example, if there is a particular sub-event within a trigger event (e.g., a particular state within an application workflow), there may be a virtual identifier specific to all interactions related to that sub-event in addition to a virtual identifier for the trigger event itself.

To allow for the different types of identifier activities that the virtual identifier may be used for, the virtual identifier request may include parameters for the virtual identifier. For example, the virtual identifier request may include a time period during which the virtual identifier should be active (e.g., the time period of the corresponding trigger event), restrictions on what kinds of interactions the virtual identifier can be used for, or restrictions on who is allowed to use the virtual identifier. In other cases, the virtual identifier request may correspond to the trigger event and the interaction authorization system may itself determine parameters for the virtual identifier.

The interaction authorization system receives 220 a virtual identifier from the account management system corresponding to the central account, and the interaction authorization system associates 230 the central account with the received virtual identifier. For example, the interaction authorization system may associate the central account with the received virtual identifier in an identifier database that associates central accounts with virtual identifiers. The interaction authorization system may also associate the virtual identifier with the user whose action generated the corresponding trigger event. Thus, the interaction authorization system may associate interactions that occur using the virtual identifier to the user associated with the virtual identifier.

The interaction authorization system receives 240 interaction information for an interaction for which the virtual identifier was used. The interaction information includes the virtual identifier as the central account identifier for the interaction. For example, where the user uses the central account to interface with another network entity system and the user uses an assigned virtual identifier, the interaction information for the interfacing with the other system includes the virtual identifier assigned to the user. To ensure that the interaction complies with restrictions set by the network entity system with the interaction authorization system, the interaction authorization system associates 250 the interaction with the user based on the virtual identifier by matching the virtual identifier received in the interaction information with the virtual identifier associated with user or the virtual identifier associated with the trigger event or interaction. The interaction authorization system may associate the user with the interaction by creating an entry in an interaction database that associates the interaction with the user.

To the extent that there are restrictions to be applied, the interaction authorization system may apply restrictions to the interaction information based on which user is associated with the interaction. For example, the interaction authorization system may determine whether the user has been pre-approved for the interaction or whether the user has parameters that they were given for the interaction.

The interaction authorization system also may generate an interaction log that includes the received interaction information. The interaction log presents interactions that have been performed using the central account, including interactions for multiple users. The interaction log may reconcile interactions by organizing the interactions based on users. For example, the interaction authorization system may use the interaction database to determine which interactions are associated with a user, and organizes the interactions presented in the interaction log based on which user each interaction is associated with. In some embodiments, the interaction log is provided for display on an entity system. Certain aspects of the interaction logs that are specific to a user may also be displayed on a user device. In some embodiments, the interaction authorization system provides a dashboard that the entity can use to review interactions as they come in and reconcile interactions on a regular basis.

Figure 3:
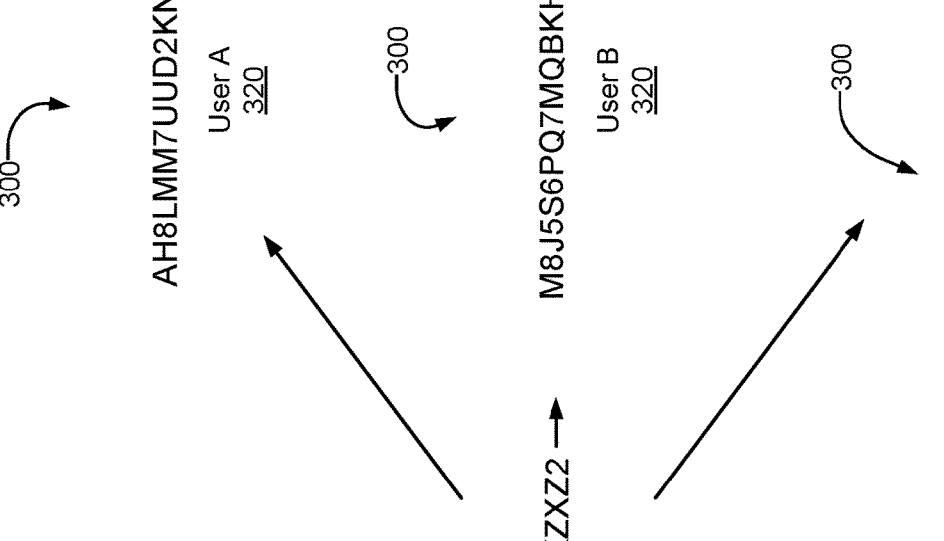
FIG. 3 illustrates an example use of virtual identifiers to reconcile interactions associated with a central account, in accordance with some embodiments.

FIG. 3 illustrates an example use of virtual identifiers to reconcile interactions associated with a central account, in accordance with some embodiments. An interaction authorization system may generate virtual identifiers 300 for a central account 310 for different trigger events.

As explained above, each of these virtual identifiers 300 may be associated with a different user 320. When the interaction authorization system receives interaction information for an interaction 330, the interaction information includes the virtual identifier 300 used for the interaction 330. Thus, the interaction authorization system can associate each interaction 330 with the user 320 who corresponds to the virtual identifier.

Figure 4:
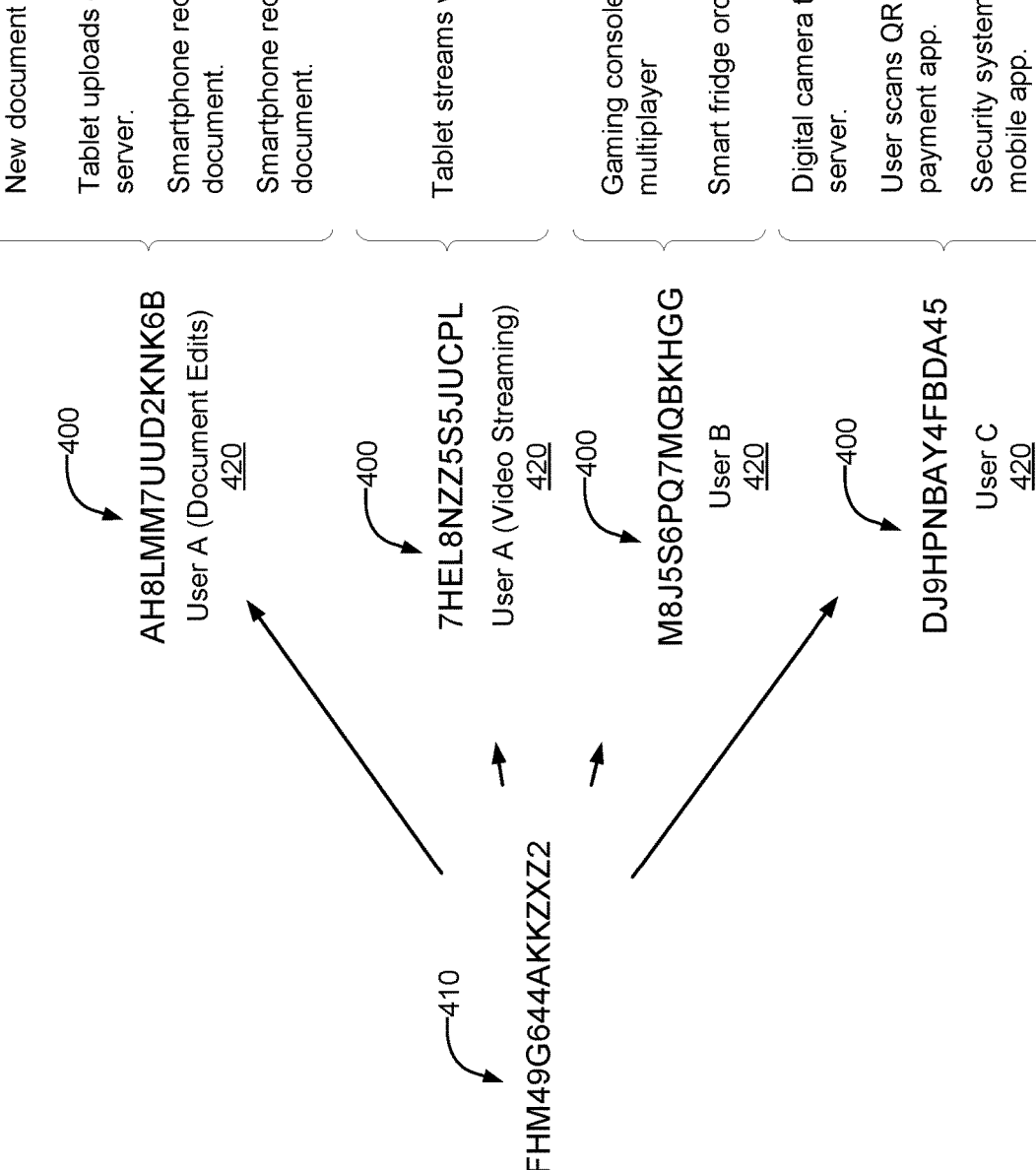
FIG. 4 illustrates another example use of virtual identifiers to reconcile interactions associated with a central account, in accordance with some embodiments.

FIG. 4 illustrates another example use of virtual identifiers to reconcile interactions associated with a central account, in accordance with some embodiments. Similar to FIG. 3, an interaction authorization system may generate virtual identifiers 400 for central account 410 for different trigger events. In the embodiment illustrated in FIG. 4 however, each of these virtual identifiers 400 is associated with a different trigger event 420. When the interaction authorization system receives interaction information for an interaction 430, the interaction information include the virtual identifier 400 used for the interaction 430. Thus, the interaction authorization system can associate each interaction 430 with the trigger event 420 to which the interaction 430 corresponds based on the virtual identifier used for the trigger event 420.

FIG. 4 illustrates trigger events 420 where a user is taking some action that causes the trigger event. However, alternative embodiments may simply associate interactions 430 with trigger events 420 without necessarily associating the interactions 430 with the user who took the action.

In some embodiments, the virtual identifier issued for the central account is a card token issued for a corporate credit card. The interaction authorization system may be an expense management system that enforces expense policies on corporate credit card use by employees of the associated network entity system 140. When the user causes a trigger event (e.g., plans a business trip or a business lunch), the interaction authorization system may request a card token from the account management system. In these embodiments, the account management system may be a card network system. The interaction authorization system associates the card token with the user and the user can use the card token for transactions to place on the corporate credit card. The interaction authorization system receives transaction data from the account management system that specifies the card token used for each transaction. The interaction authorization system can thereby determine which user performed each transaction. The interaction authorization system can thus reconcile transactions placed on a corporate credit card by different users.

An expense management system dynamically generates card tokens for a corporate credit card to improve the transaction reconciliation process. The expense management system generates card tokens for a credit card when the system detects tokenization events. These tokenization events are actions taken by users for which a user is likely to incur expenses on the credit card to be reimbursed by the business associated with the credit card. For example, a tokenization event may be a user scheduling a business trip, a user attending a business meal, or a user organizing an office event. This tokenization system works for any type of credit card issued by any issuing bank associated with a credit card company (e.g., a Visa card issued by Chase bank, a Mastercard issued by Citibank, etc.).

When the expense management system detects a tokenization event, the expense management system requests a card token for the credit card from a card network system. A card token is an identifier (e.g., a unique identifier), such as a randomly-generated string of characters that can be used as a replacement identifier for the credit card without using the credit card's identifier (e.g., credit card number) directly. It can be based in some manner on the credit card number, or can be a completely independent number that is then associated with the credit card.

The expense management system associates the card token with one or more parts of the transaction, such as the user associated with the corresponding tokenization event, or with the event itself (e.g., a business trip) or a subevent or component of an event (e.g., or a plane flight associated with a business trip). Thus, when the expense management system receives a transaction that specifies that a card token was used for the transaction, the expense management system can associate the transaction with the user that incurred the expense, or with the particular transaction or tokenization event or subevent or component of the event. The expense management system can then apply expense policies to the transaction based on the user (and/or event/ subevent) associated with the transaction. In some embodiments, a company can register or otherwise link its existing corporate credit card with the expense management system, and simply continue to use this card going forward, but the expense management system will now generate tokens for users and/or tokenization events or transactions related to the card, thus greatly simplifying reconciliation of different transactions by different users. In other embodiments, a user can register or otherwise link a user's personal credit card (e.g., personal Visa, Amex, Mastercard, etc.) with the expense management system, and similarly the system can generate tokens for business expenses.

By using card tokens to associate users with transactions, the expense management system automates the process of reconciling a set of transactions incurred by different users on the same corporate credit card. These techniques can dramatically reduce the amount of human labor required to identify which transactions may be covered by a business's expense policies. Additionally, the expense management system can reconcile transactions that a user incurs on a corporate credit card without the user having to manually identify their transactions, thereby improving the user's experience with the expense management system.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

detecting, by an interaction authorization system, a plurality of trigger events representing actions taken by a plurality of users, wherein each user is associated with a corporate credit card of a networked entity, and wherein detecting a trigger event of the plurality of trigger events comprises receiving, at the interaction authorization system, a request from the user to plan a travel event through the interaction authorization system;

for each of the plurality of trigger events:
responsive to detecting the trigger event, transmitting, by the interaction authorization system, a card token request to a card network system for the corporate credit card based on the trigger event;
receiving, by the interaction authorization system, a card token from the card network system, wherein the card token comprises a string of characters for identifying the corporate credit card of the networked entity;
associating, by the interaction authorization system, the card token with the trigger event in a database;
receiving, by the interaction authorization system, interaction information describing an interaction for which the corporate credit card was used to authorize the interaction, wherein the interaction was an interaction between the user and a networked entity of the card network system, wherein the interaction information includes the card token, and wherein the interaction relates to the travel event of the trigger event;
associating, by the interaction authorization system, the interaction with the trigger event based on the card token in the interaction information; and
generating, by the interaction authorization system, an interaction log describing the interactions associated with the plurality of trigger events, wherein the interaction log associates each interaction with the corresponding trigger event.

2. The method of claim 1, wherein detecting a trigger event comprises:
receiving a user interaction with a user interface of a client application of the interaction authorization system.

3. The method of claim 1, wherein the travel event comprises a booking of a flight.

4. The method of claim 1, wherein the card token request includes a plurality of parameters for the card token.

5. The method of claim 4, wherein the plurality of parameters includes at least one of: a time period during which the card token may be used, restrictions on a type of interaction for which the card token may be used, or restrictions on users who may use the card token.

6. The method of claim 1, further comprising:
detecting another trigger event associated with the user; and
associating the card token with the other trigger event.

7. The method of claim 1, further comprising:
detecting another trigger event associated with the user; and
transmitting another card token request to the card network system based on the other trigger event.

8. The method of claim 1, wherein associating the card token with the trigger event comprises:
associating the card token with the user in the database.

9. The method of claim 1, further comprising:
applying interaction rules to the interaction based on the association of the card token with the trigger event in the database.

10. The method of claim 1, further comprising:
generating an interaction report including the interaction, wherein the interaction report associates the interaction with the trigger event.

11. A non-transitory computer-readable medium storing computer-executable instructions that, when executed, cause a computing system to perform operations comprising:
detecting, by an interaction authorization system, a plurality of trigger events representing actions taken by a plurality of users, wherein each user is associated with a corporate credit card of a networked entity, and wherein detecting a trigger event of the plurality of trigger events comprises receiving, at the interaction authorization system, a request from the user to plan a travel event through the interaction authorization system;
for each of the plurality of trigger events:
responsive to detecting the trigger event, transmitting, by the interaction authorization system, a card token request to a card network system for the corporate credit card based on the trigger event;
receiving, by the interaction authorization system, a card token from the card network system, wherein the card token comprises a string of characters for identifying the corporate credit card of the networked entity;
associating, by the interaction authorization system, the card token with the trigger event in a database;
receiving, by the interaction authorization system, interaction information describing an interaction for which the corporate credit card was used to authorize the interaction, wherein the interaction was an interaction between the user and a networked entity of the card network system, wherein the interaction information includes the card token, and wherein the interaction relates to the travel event of the trigger event;
associating, by the interaction authorization system, the interaction with the trigger event based on the card token in the interaction information; and
generating, by the interaction authorization system, an interaction log describing the interactions associated with the plurality of trigger events, wherein the interaction log associates each interaction with the corresponding trigger event.

12. The non-transitory computer-readable medium of claim 11, wherein detecting a trigger event comprises:
receiving a user interaction with a user interface of a client application of the interaction authorization system.

13. The non-transitory computer-readable medium of claim 11, wherein the travel event comprises a booking of a flight.

14. The non-transitory computer-readable medium of claim 11, wherein the card token request includes a plurality of parameters for the card token.

15. The non-transitory computer-readable medium of claim 14, wherein the plurality of parameters includes at least one of: a time period during which the card token may be used, restrictions on a type of interaction for which the card token may be used, or restrictions on users who may use the card token.

16. The non-transitory computer-readable medium of claim 11, further comprising:
detecting another trigger event associated with the user; and
associating the card token with the other trigger event.

17. The non-transitory computer-readable medium of claim 11, further comprising:
detecting another trigger event associated with the user; and
transmitting another card token request to the card network system based on the other trigger event.

18. The non-transitory computer-readable medium of claim 11, wherein associating the card token with the trigger event comprises:
associating the card token with the user in the database.

19. The non-transitory computer-readable medium of claim 11, further comprising:

applying interaction rules to the interaction based on the association of the card token with the trigger event in the database.

20. The non-transitory computer-readable medium of claim 11, further comprising:

generating an interaction report including the interaction, wherein the interaction report associates the interaction with the trigger event.

* * * * *